W. W. SYFERT.
PISTON RING.
APPLICATION FILED APR. 5, 1919.
1,392,536.
Patented Oct. 4, 1921.
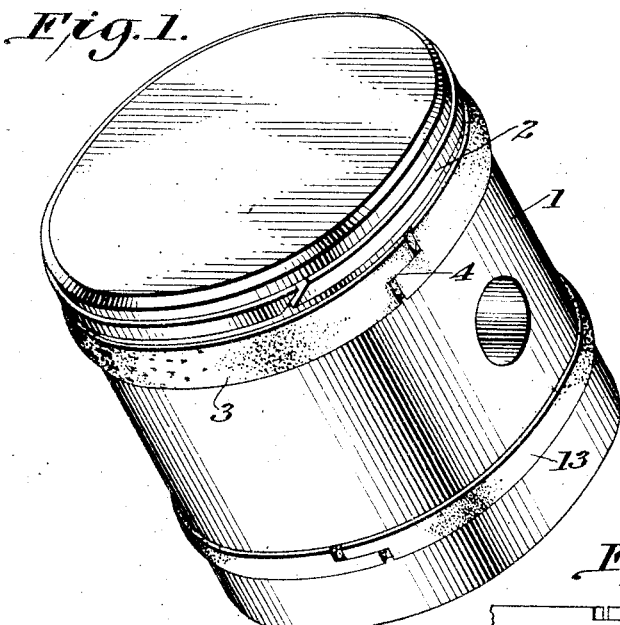
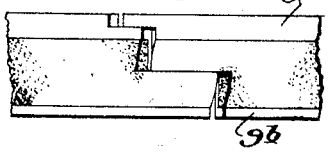
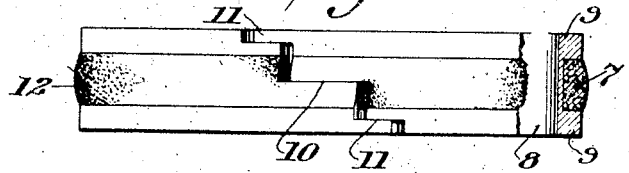
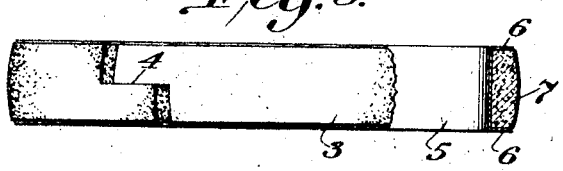
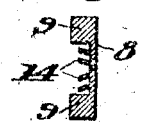
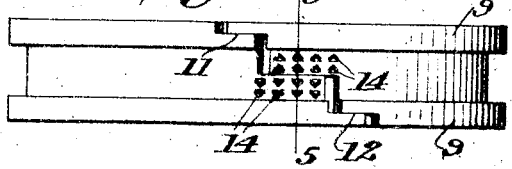
Inventor
W. W. Syfert
by G. Howlett Davis
Attorney.

UNITED STATES PATENT OFFICE.

WILLIAM W. SYFERT, OF TULSA, OKLAHOMA, ASSIGNOR OF ONE-HALF TO C. A. COOPER, OF TULSA, OKLAHOMA.

PISTON-RING.

1,392,536.

Specification of Letters Patent.   Patented Oct. 4, 1921.

Application filed April 5, 1919. Serial No. 287,735.

*To all whom it may concern:*

Be it known that I, WILLIAM W. SYFERT, a citizen of the United States, residing at Tulsa, in the county of Tulsa and State of Oklahoma, have invented certain new and useful Improvements in Piston-Rings, of which the following is a specification.

This invention relates to piston rings, and more particularly to rings for use on the pistons of internal combustion engines.

The object of the invention is to provide a piston ring which will be nearer leak proof than those heretofore proposed and thus secure better compression, and which may at the same time wear well and give satisfactory service.

In order that the invention may be readily understood, reference is had to the accompanying drawings forming a part of this specification and in which, Figure 1 is a perspective view of a gas engine piston equipped with my improved rings;

Fig. 2 is an edge elevation partly in section showing one form of my improved ring;

Fig. 3 is a similar view showing a modified form thereof;

Fig. 4 is an edge view of one of my improved rings with the packing material omitted;

Fig. 5 is a sectional view on the line 5—5 of Fig. 4; and

Fig. 6 is a fragmentary edge elevation of a still further slightly modified construction of ring.

I propose to provide a ring comprising a metallic body having any suitable form of lap joint, so as to be readily removable from the piston, and provided with a peripheral groove in which is seated an insert or packing of soft resilient material which is adapted to engage the cylinder walls. I have found that the best material for this purpose is a composition formed of comminuted cork united by a suitable binder.

Referring to the drawings in detail, 1 designates a piston of the usual or any desired form, and near the inner end of such piston is located a metallic packing ring 2 and one of my improved rings 3. As shown in Fig. 1, my improved ring is provided with any desired form of lap joint 4.

The ring 3 illustrated in Fig. 1, is shown in detail in Fig. 3. By reference to this figure it will be seen that the ring comprises a body 5 formed in this instance of sheet metal. This body is provided with flanges 6 forming between them a groove for the reception of my improved packing material 7. This material, as above stated, comprises a mixture of comminuted cork with a suitable binder. This may either be molded into the desired shape or cut from sheets of the composition. In any event, I prefer to form the outer face of the packing curved or convex so that it projects beyond the body portion of the ring, so as to engage the cylinder walls. This material is of a soft, compressible, resilient nature, and when forced into the cylinder it enters and fills any slight irregularity in the interior walls thereof.

In order to still further improve the operation of my packing ring, I have found that excellent results can be obtained by impregnating the cork material with graphite. The particular form of graphite which I prefer to employ is that derived from the distillation of crude petroleum. This is of the consistency of a liquid, and when heated, the cork composition may be thoroughly impregnated therewith. This graphite, when the ring is in use, soon forms a polished or glazed coating on the surface of the packing material, thus practically protecting it from wear.

While I have shown in Fig. 3 the body 5 of the ring as formed of sheet metal and the insert 7 as being comparatively wide, I also contemplate making a ring such as shown in Fig. 2. By reference to this figure it will be seen that the body 8 of the ring is relatively thick and has a peripheral groove formed therein to receive the packing, such packing being relatively narrow, so that marginal portions 9 are left at either side of the ring. In this figure I have also illustrated a different form of joint comprising a plurality of stepped or lapped portions 10 and 11.

Instead of forming the marginal portions 9 of the same width, as illustrated in Fig. 2, I may make them of different widths, as shown at 9ª and 9ᵇ in Fig. 6.

In order to assist in holding the cork insert in place adjacent the lapped joint of the ring, I may provide spurs or prongs 14 at the bottom of the groove, as shown in Figs. 4 and 5. These prongs become embedded in the cork composition at either side of the central lap of the joint as will be understood, and assist in retaining the insert in position. In Fig. 4, auxiliary steps 11 and 12 are shown in addition to the main central step or lap.

It will be understood, of course, that I may employ any desired number of my improved rings which seems necessary. Referring again to Fig. 1, it will be seen that I have illustrated a third ring 13, in addition to the two rings 2 and 3.

While it is not in all cases necessary to use the metallic ring 2 in connection with my improved cork rings, I find that the use of such a metallic ring serves to protect the packing of my improved rings from injury by the excessive heat caused by the ignition of the fuel. In other words, the metallic ring 2 prevents to a large extent the hot gases from coming in direct contact with the packing ring 3, such packing ring serving only to stop the leakage which occurs past the ring 2.

What I claim is:—

1. A piston ring comprising a metallic body having an annular groove, and a packing of compressible resilient material set into said groove, such material comprising comminuted cork mixed with a suitable binder.

2. A piston ring comprising a metallic body having an annular groove, and a packing of compressible resilient material set into said groove, such material comprising comminuted cork mixed with a suitable binder, and impregnated with graphite.

3. A piston ring comprising a supporting body having a peripheral groove, a packing of relatively soft resilient material set into said groove, said ring carrying projections at the bottom of said groove adapted to engage the packing material and hold it in position.

In testimony whereof I affix my signature.

WILLIAM W. SYFERT.